United States Patent [19]
Cumming et al.

[11] Patent Number: 5,873,115
[45] Date of Patent: Feb. 16, 1999

[54] CACHE MEMORY

[75] Inventors: Peter Cumming, La Gaude, France; Richard Grisenthwaite, Fife, Scotland

[73] Assignee: SGS-Thomson Microelectronics Limited, Almondsbury Bristol, United Kingdom

[21] Appl. No.: 735,863

[22] Filed: Oct. 23, 1996

[30] Foreign Application Priority Data

Oct. 26, 1995 [GB] United Kingdom ................ 9521955.6

[51] Int. Cl.[6] .................................................. G06F 12/00
[52] U.S. Cl. ........................ 711/129; 711/151; 711/153; 711/158; 711/173
[58] Field of Search ................................... 711/129, 151, 711/153, 158, 173, 130, 147

[56] References Cited

U.S. PATENT DOCUMENTS

| 3,781,812 | 12/1973 | Wymore et al. ........................ 711/217 |
| 4,503,501 | 3/1985 | Coulson et al. ........................ 711/129 |
| 4,847,755 | 7/1989 | Morrison et al. ........................ 395/379 |
| 4,905,141 | 2/1990 | Brenza ..................................... 711/129 |
| 5,357,623 | 10/1994 | Megory-Cohen ....................... 711/129 |
| 5,434,992 | 7/1995 | Mattson ................................... 711/119 |
| 5,537,635 | 7/1996 | Douglas ................................... 711/129 |

FOREIGN PATENT DOCUMENTS

| 0 649 084 A1 | 4/1995 | European Pat. Off. .......... G06F 9/38 |
| 0 690 373 A1 | 1/1996 | European Pat. Off. .......... G06F 9/38 |

OTHER PUBLICATIONS

*European Search Report*, from British application No. UK 9521955.6, filed Oct. 26, 1995.

Partial Address Recording in Branch History Tables, IBM Technical Disclosure Bulletin, vol. 36, No. 6B, Jun. 1, 1993, p. 379 XP000377423.

*Primary Examiner*—Tod R. Swann
*Assistant Examiner*—Mehdi Namazi
*Attorney, Agent, or Firm*—Wolf, Greenfield & Sacks, P.C.

[57] ABSTRACT

A cache memory has a plurality of cache partitions each having a CAM array, a data RAM and output control circuitry which determines a different priority for each cache partition and permits a cache hit output only from one partition which has the highest priority with a cache hit.

14 Claims, 9 Drawing Sheets

Fig.1.

| | WORD ADDRESS | | BYTE ADDRESS | | INSTRUCTION NUMBER |
|---|---|---|---|---|---|
| X | 0 0 | 0 | 0 0 | | 0 |
| X | 0 0 | 0 | 0 1 | | 1 |
| X | 0 0 | 0 | 1 0 | | 2 |
| X | 0 0 | 0 | 1 1 | | 3 |
| X | 0 0 | 1 | 0 0 | | 4 |
| 13 cj | 0 0 | 1 | 0 1 | | 5 |
| X | 0 0 | 1 | 1 0 | | 6 |
| 0 cj | 0 0 | 1 | 1 1 | | 7 |
| X | 0 1 | 0 | 0 0 | | 8 |
| 13 cj | 0 1 | 0 | 0 1 | | 9 |
| X | 0 1 | 0 | 1 0 | | 10 |
| X | 0 1 | 0 | 1 1 | | 11 |
| 16 j | 0 1 | 1 | 0 0 | | 12 |
| X | 0 1 | 1 | 0 1 | | 13 |
| 2 cj | 0 1 | 1 | 1 0 | | 14 |
| X | 0 1 | 1 | 1 1 | | 15 |
| X | 1 0 | 0 | 0 0 | | 16 |
| X | 1 0 | 0 | 0 1 | | 17 |
| X | 1 0 | 0 | 1 0 | | 18 |
| X | 1 0 | 0 | 1 1 | | 19 |

Groups: 101 (instructions 0–3), 102 (4–7), 103 (8–11), 104 (12–15), 105 (16–19)

CACHE MEMORY

The present invention relates to cache memories, methods of operating cache memories and to computer systems including cache memories.

Such cache memories may be used to hold target addresses for branch instructions used in a program sequence for a computer system.

For the purposes of the present description and claims, the term "branch instruction" will be used to include both conditional and non-conditional jump instructions.

In this specification the term instruction includes primitive operations which may be included in a VLIW system using Very Long Instruction Words. An instruction word or sequence may therefore comprise a VLIW instruction.

SUMMARY OF THE INVENTION

The invention provides a cache memory comprising a plurality of cache partitions each comprising a CAM array and a connected associated data RAM, said cache having a first input for receiving input address data to determine if the cache holds data corresponding to said input address data and thereby provide a cache hit, a cache output for outputting data from one of said data RAMs if a cache hit occurs, and output control circuitry arranged to determine a desired different priority for each partition to permit a cache output from one of said partitions which has the highest priority with a cache hit and inhibit any cache output from partitions of priority lower than said one partition.

Preferably each said data RAM has its bit lines connected through pass control circuitry to the bit lines of another data RAM to provide a serial connection between the data RAMs, with the bit lines of the final said data RAM connected to said cache output. Said data RAMs so connected form a common datapath to said cache output.

Preferably said pass control circuitry is arranged to inhibit an output from any data RAM connected in said data path at a position further from said cache output than the cache partition nearest the cache output for which a hit occurs, thereby designating each cache partition in decreasing priority as its connection to said data path is more remote from said cache output.

Preferably each CAM is arranged to provide a CAM output to indicate a hit or miss in the partition of that CAM and each said CAM output is connected to respective pass control circuitry in said data path to isolate any data RAM further from said cache output when a hit occurs in that partition.

It will be seen that by connecting the data RAMs of each cache partition serially in a common data path leading to the cache output it is possible to reduce the amount of interconnect wiring which is necessary in the cache. Normally the bit lines of the data RAMs are connected to sense amplifier circuitry at the cache output and by use of the arrangement above it is possible to avoid separate wiring from the bit lines of each data RAM to the sense amplifier. The data path provides a serial connection between the bit lines of successive data RAMs in each of the partitions and the pass control circuitry is located in those serial lines so as to block any output from data RAMs further from the sense amplifier than the data RAM for which a cache hit occurs nearest the connection to the sense amplifiers. In this way each partition has a decreasing priority on moving along the serial data path away from the sense amplifier.

In one embodiment said first input is connected to each said CAM array, a second input is also provided to each CAM array and masking circuitry is provided for each partition, said masking circuitry being connected to receive said second input which is used to determine which partition is masked by its masking circuitry so as to prevent a hit output from the masked partition regardless of said first input.

The invention also provides a method of operating a partitioned cache memory to provide a selected output from one partition of the cache, which method comprises connecting a CAM array and associated data RAM in each partition of the cache, providing input address data to a first input of the cache to determine if any partition holds data corresponding to said input address data and thereby provide a cache hit, determining a desired different priority for each partition in the cache and controlling output circuitry connected to a cache output to permit a cache output from one of said partitions which has the highest priority with a cache hit and inhibit any cache output from partitions of lower priority than said one partition.

Preferably the bit lines of the data RAM of each partition are connected serially in a common data path to the cache output, said method further comprising selectively operating pass control circuitry in the data path to permit a cache output from the cache partition nearest the cache output in which a hit occurs and prevent any output from cache partitions further from the cache output than the nearest partition with a cache hit.

Preferably an output from the cache partition nearest the cache output having a cache hit, is supplied on said data path to a sense amplifier circuit at said cache output.

In one embodiment a first input is supplied to each CAM array of the cache, said first input comprising the most significant bits of an address, a second input is provided to each partition, the second input representing the least significant bits of said address, and masking circuitry is responsive to said second input to mask selected cache partitions in dependence on said second input.

BRIEF DESCRIPTION OF THE DRAWINGS

FIG. 1 shows a simplified example of a series of instructions;

FIG. 1 shows a series of twenty one-byte instructions 0–19 in a computer program. As seen in the figure, each instruction is represented by an instruction number (0–19) and by an address indicative of a storage location at which the instruction is stored and which is represented by the binary equivalent of the instruction number. The instructions are illustratively grouped into sequences of four instructions 101, 102, 103, 104, 105. Each of these groups is termed an instruction word. Each instruction word has a single word address, that of instruction word 101 being "000", that of instruction word 102 being "001", and so on. Each instruction has a byte address indicating its position within the word, so that the first instruction of each word has byte address "00", the second "01" and so on. The majority of the instructions, specifically instructions 0–4, 6, 8, 10, 11, 13 and 15–19 lead directly onto the next sequential instruction; these instructions are marked 'X'. Instruction 12 (marked 'j') is termed an unconditional jump, because if execution reaches instruction 12 the result is to jump to instruction 16. Instructions 5, 7, 9 and 14 (marked 'cj') are each termed conditional jumps. The next instruction to be executed after a conditional jump typically depends upon a condition tested, and may for instance be determined by whether the value of the operand, stored as a result of the instruction which immediately precedes the conditional jump in time, exceeds a given value. The instruction to which the jump will occur if the condition is met is indicated in the figure. Thus instruction 5 will either be succeeded in time by instruction 6, or by instruction 14 depending on the value returned by instruction 4. Instruction 7 will be succeeded by instruction 8 or by instruction 0 depending upon the value returned by instruction 6. Instruction 9 will be succeeded by instruction 13 or by instruction 10 depending upon the value returned by instruction 8. Instruction 14 will be succeeded either by instruction 15, or by instruction 2 depending upon the value returned by instruction 13.

Figure 2:
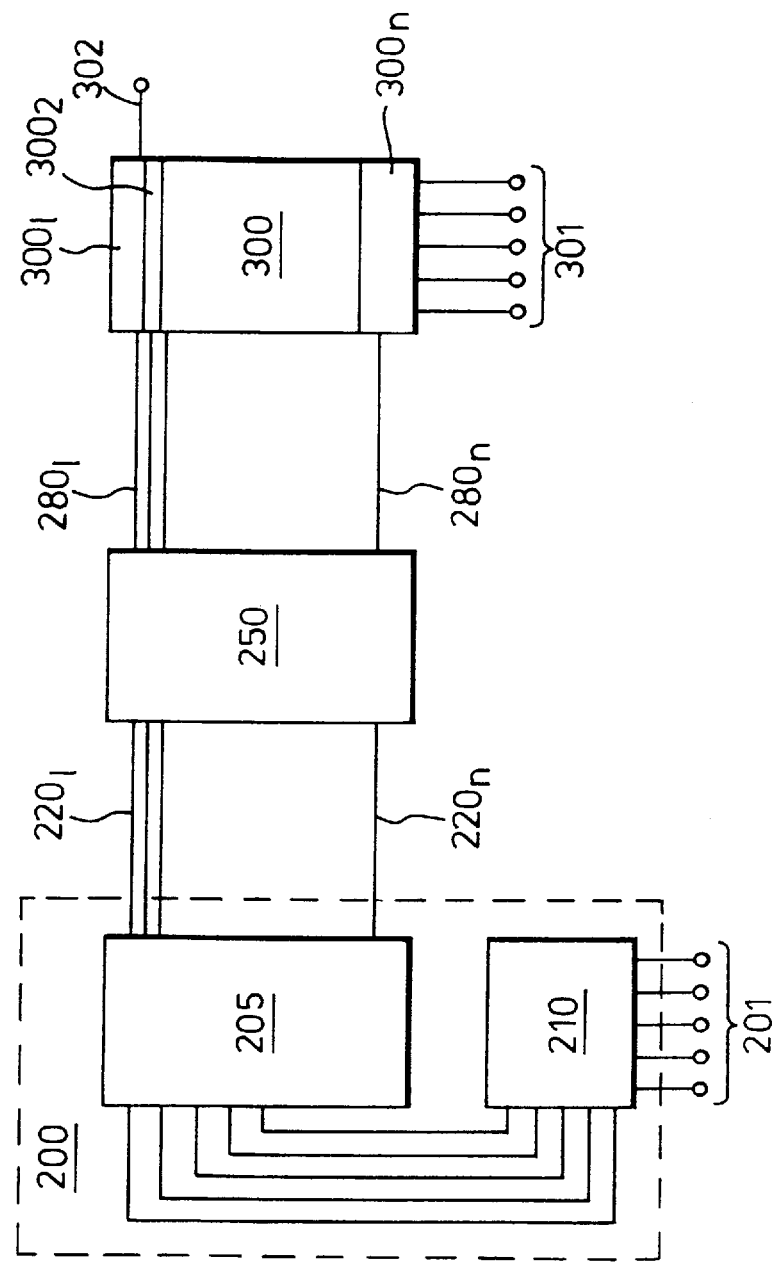
FIG. 2 shows a partial schematic diagram of circuitry for implementing the method of this invention.

In some computers, the instructions will be fetched from store individually, with instruction 0 fetched first, and then instruction 1 fetched, and so on. However, in certain computers, it has been proposed to associate plural instructions together in sequence called instruction words, so that fetching from an addressable location makes available the plural instructions of the word for execution. In the present description, the term instruction word is not intended to be limitative and is used for convenience to refer to a plurality of instructions, or one VLIW instruction, which may be fetched by accessing a single address in store.

In the example of instruction words shown in FIG. 1, the first instruction word 101 contains no branch instructions, ie. no conditional jumps and no unconditional jumps. The second instruction word 102 contains two conditional jump instructions, instructions 5 and 7. The third instruction word 103 contains one conditional jump instruction, instruction 9. The fourth instruction word 104 contains one unconditional jump instruction, instruction 12 and one conditional jump instruction, instruction 14. The fifth instruction word contains no jump or conditional jump instructions.

It will be appreciated that the program flow due to executing the first instruction word 101 will always be the same, namely executing the first instruction 4 of second instruction word 102. Executing the second instruction word 102 causes three possible program flows, namely executing the first instruction 8 of third instruction word 103 (if no conditional jump is effected), executing the second instruction 13 of the fourth instruction word 104 (if the conditional jump at instruction 5 is effected) or executing the first instruction 0 of first instruction word 101 (if the conditional jump at instruction 7 is effected). Similarly, the outcome of executing the third instruction word 103 is either to execute the first instruction 12 of fourth instruction word 104 (if the conditional jump at instruction 9 is not effected) or executing the second instruction 13 of fourth instruction word 104 (if conditional jump instruction 9 is effected). Finally, the outcome of executing fourth instruction word 104 is either executing instruction 16, which occurs if the first instruction 12 of instruction word 104 has been executed or if the conditional jump instruction 14 is not effected, or the alternative outcome is a return to instruction 2 of first instruction word 101.

For optimum speed of operation, the computer, having fetched a given instruction word for execution, should next fetch the correct instruction word, in the sense of the instruction word containing the next instruction which is required to be executed. However, it will be seen from the foregoing that the identity of the next instruction to be executed may vary if the current instruction word contains any branch instruction. Take for example fourth instruction word 104:

Instruction word 104 may be fetched either in response to executing instruction 9 or instruction 11 of third instruction word 103 or to executing instruction 5 the second instruction word 102. The next correct instruction word to fetch after word 104 is either first instruction word 101 or fifth instruction word 105. By examining fourth instruction word 104, the reader will note that if instruction 11 of third instruction word 103 were executed, then the first instruction 12 of fourth instruction word 104 would be executed next, and the result of that would be that fifth instruction word 105 is the next word to fetch. If however fourth instruction word 104 were fetched as a result of the conditional jump instruction 9 or the conditional jump instruction 5, the identity of the next correct instruction word to fetch depends upon the outcome of the conditional jump in instruction 14.

Continuing to consider the fourth instruction word 104, fetching a wrong word (for example, first instruction word 101 being fetched instead of fifth instruction word 105) would result in the processing pipeline containing a number of wrong instructions which would of course not be executed. The practical consequence of this would be that a number of cycles would be lost, during which no useful execution took place; only on a subsequent correct cycle would the correct fifth instruction word 105 be executed, after being called up into the pipeline.

A simplified device illustrating some of the features of the present invention will now be described with respect to FIG. 2.

Referring to FIG. 2, the device comprises memory circuitry 200 which consists of a memory array 205 having a plurality of addressable locations and an address decoder 210 for addressing the memory array 205. The address decoder 210 has an input 201 over which it receives instruction addresses within a single instruction word. The address decoder produces address outputs corresponding to the input instruction address and all later instruction addresses up to the end of the relevant instruction word. The number n of storage locations in the memory array 205 is at least equal to the number of instructions in the program sequence currently being run. The memory locations of the array 205 store at the address of respective instructions, information showing whether the instruction is a branch instruction or not, i.e. a logical 0 where the instruction is not a branch instruction, and a logical 1 if the instruction is a branch instruction. Each memory location has a respective output line $220_1$–$220_n$. The output lines $220_1$–$220_n$ are coupled to a register arrangement 250, having storage locations corresponding to each of the lines $220_1$–$220_n$, for storage of branch prediction values. Each register location has a respective input formed by one of the lines $220_1$–$220_n$ and a respective output line $280_1$–$280_n$. The register locations store logical 1 where an associated branch instruction is predicted as taken, and a logical 0 where an associated branch instruction is predicted as not taken. When an instruction address is input over input lines 201, the address decoder 210 addresses the corresponding locations of the array 205 and, where an instruction at a corresponding address is a branch instruction, there will be a logical 1 output on the corresponding one of the output lines $220_1$–$220_n$ which in turn accesses the register 250 and produces on an output line 280 either a corresponding logical 1 if the branch is predicted as taken, or a corresponding logical 0 if the branch is predicted as not taken. Where one or more of the addressed locations is not a branch instruction, logical zeros will be output over the corresponding output lines $220_1$–$220_n$.

The logic stage stored in register location corresponding to non-branch instructions is not significant because no logical 1 can occur on a line $220_1$–$220_n$ unless the associated instruction is a branch instruction. As a result the output for each location which corresponds to a non-branch instruction will always be logical 0. The output lines $280_1$–$280_n$ of the register 250 form word lines to a store 300 which stores target addresses of branch instructions. The store 300 has a first address output 301 at which the store 300 delivers the target address of a branch instruction, and a second output 302 which provides a logical 1 when any branch instruction is predicted as taken. The store 300 has one row $300_1$–$300_n$. for each word line $280_1$–$280_n$, and each row contains memory cells connected to the output lines 301 so that application of a logical 1 to one of the word lines $280_1$–$280_n$ produces an address on output lines 301. Store circuitry 300 also contains gating circuitry having an output to the second output line 302 and producing a logical 1 at output line 302 when a branch is predicted as taken. The store circuitry 300 further contains decision circuitry which provides only the target address of the first jump instruction from the word which is predicted as taken.

Before operating the device of FIG. 2, it is initialised by sequentially addressing the memory array 205 and storing a logical 1 at the address locations of memory array 205 which correspond to branch instructions. The register circuitry 250 is loaded, during the initialising stage, with prediction information indicating whether or not the associated branch instructions are predicted taken. The store circuitry 300 is loaded with address information corresponding to the target addresses of the branch instructions stored in memory array 205. The circuitry necessary for effecting the initialisation of the circuitry of FIG. 2 is not shown.

Once the initialisation has been effected, the program sequence can be run. To do this, the address of the first instruction, instruction 0 of first instruction word 101 is fed to input 201 to memory circuitry 200. This causes addressing of the memory array 205 at all locations corresponding to instructions in the first word. Because the first instruction word 101 contains no jump instructions, no logical 1 will be output. Hence the output lines $220_1$–$220_n$ will all carry logical zero, and these logical zeros are applied to the register 250. The result of applying all logical zeros to the inputs of the register store 250 is to provide on output lines $280_1$–$280_n$ outputs comprising all logical zeros. The store circuitry 300 receives the logical zeros and provides an output of logical zero at the first output 301 and an output of logical zero at the second output 302.

In the present example, the first instruction word 101 contains no branches and thus no target address is output at output 302. Accordingly execution proceeds with the fetching of the second word 102.

Accordingly the next instruction word to be fetched is the second instruction word 102. For the second instruction word 102, the memory circuitry stores a logical 1 at the address corresponding to instruction 5 at byte position 2 the byte positions in each word being designated 1 to 4) of that instruction word and a logical 1 at the address corresponding to instruction 7, at byte position 4 of that instruction word. Logical one is output from the memory circuitry over the output line $220_1$–$220_n$ corresponding to the second position and over the output line $220_1$–$220_n$ corresponding to the fourth position in the second instruction word 102. These logical one inputs are provided to the register 250 which in turn provides logical one outputs over those register output lines $280_1$–$280_n$ which correspond to branch instructions which are predicted as to be taken. Thus, the one of the register output lines $280_1$–$280_n$ corresponding to the second position of the second instruction word 102 will carry a logical one if it is predicted that the conditional jump instruction 5 will be taken and the line corresponding to the fourth instruction position of second instruction word 102 will carry a logical one if it is predicted that the conditional jump instruction 7 is effected.

These logical one inputs are provided to the store circuitry 300 so as to read the target addresses of the predicted-taken branches and the decision circuitry outputs the target address of the first occurring predicted-taken branch instruction. This is because if, for example, conditional jump instruction 5 were predicted as taken, instructions 6 and 7 cannot be executed if the prediction is correct. Thus the earliest occurring predicted-taken branch in an instruction word determines the next instruction to be fetched.

The target address is used by the processor of the computer, to cause a new instruction word to be fetched containing the instruction at which execution is predicted to proceed.

In this simplified embodiment as mentioned previously, where execution of the instructions in an instruction word starts other than at the first instruction of that word, the address of the initial instruction is input over inputs 201 and the address decoder 210 only applies addresses corresponding to the remaining instructions of the word to the memory array 205. Thus, for example described with respect to FIG. 1, if execution of the fourth instruction word 104 were to commence at instruction number 13, (for example in response to the conditional jump at instruction 9), the address corresponding to instruction 13 would be input over input lines 201, and address circuitry 210 would then apply the addresses of instructions 13, 14 and 15 to the memory array 205. As a result, the branch instruction at instruction 12 (which is an unconditional jump, and is always therefore predicted as taken) would not be presented on one of the memory array output lines $220_1$–$220_n$.

DESCRIPTION OF THE PREFERRED EMBODIMENT

The above description is intended to illustrate the concepts of this invention. One embodiment of circuitry for carrying out the method of the present invention, this circuitry including a branch target buffer, will now be described with reference to FIGS. 3–9.

Figure 3:
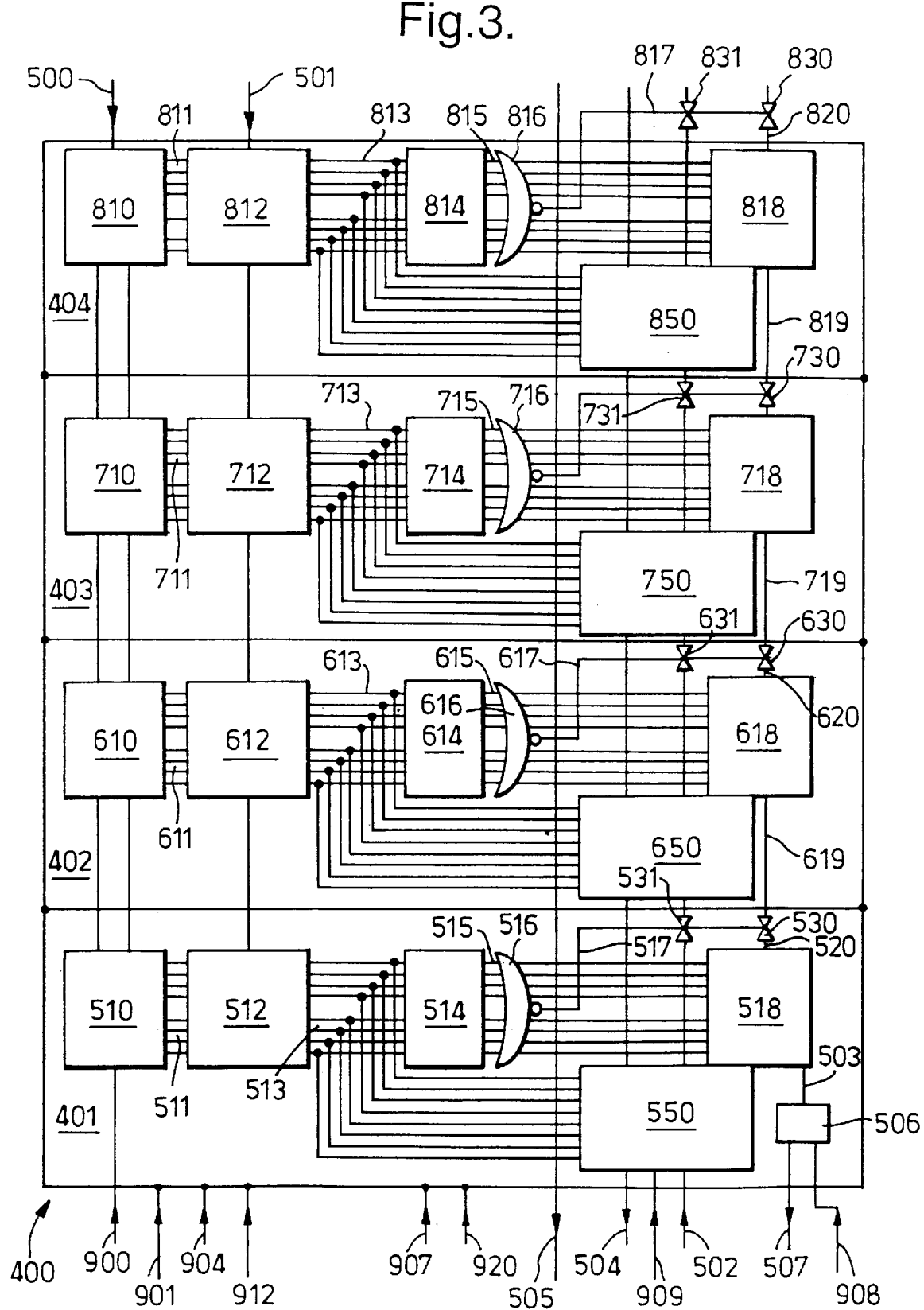
FIG. 3 shows a partial block diagram of an embodiment of a branch target buffer for implementing the invention.

Referring firstly to FIG. 3, a branch target buffer 400 consists of four generally similar sections 401–404, each referred to hereinafter as a partition.

The number of partitions of the present embodiment corresponds to the number of instructions per instruction word, and in the example described above with reference to FIG. 1, this number is 4. It will of course be understood that other numbers could be used according to the content of the instruction word; specifically in a more complex system 8 partitions could be used. It will also be appreciated by one skilled in the art that fewer partitions could be provided. For example, it would be possible for the four-byte example of FIG. 1 to only provide two partitions, one corresponding to the first two bytes of each instruction word, and the other corresponding to the second two bytes of each instruction word.

In the present example first partition 401 stores data relevant to branch instructions which are located at the first byte of a word stored in the buffer, second partition 402 stores data relevant to the branch instructions at second byte locations and so on. First partition 401 is referred to herein as the lowest partition, and fourth partition 404 as the highest partition.

Each partition of the buffer 400 includes a CAM array holding a plurality of word addresses and associated data RAMs holding target addresses for branch instructions located at the word addresses stored in the CAMs. The buffer has first and second input buses 500,501 giving the address of an instruction being fetched. The first input bus 500 is an instruction word address bus receiving the most significant bits of the instruction address and the second input bus 501 is an instruction byte address bus for the least significant bits of the address of the instruction being fetched. In the example of FIG. 1, the first three bits of the instruction address form the instruction word address and the lowest two bits form the instruction byte address. An input on bus 500 therefore enables an associate operation to determine if the buffer holds data corresponding to the word address of the instruction being fetched. The input 501 is used to control the output of the CAM arrays during a read operation so as to form a masking operation which prevents output from any partition CAM corresponding to a byte location within the word before the byte position input on line 501 (that is when the input on 501 is greater than the partition number). If a read operation in the buffer 400 has a hit for the relevant instruction identified by the inputs 500 and 501, the buffer provides a target address output on bus 507, an output 505, being a bus carrying information indicating which partitions contain branch instructions from the current instruction word which are predicted taken, and an output 504 carrying information on the "prediction strength" obtained from each partition.

It will be understood that when a processor outputs an address to memory to fetch a new instruction, that address is simultaneously fed to the buffer 400 to carry out a read operation and if the processor executes a branch instruction which is not in the buffer data relating to that branch instruction will be written into the buffer after execution by the processor so that it is ready for use at some later time. To write data into the buffer a word address input bus 900 is provided to write word addresses into the CAM arrays, a target address input 908 is provided to write into the data RAMs target addresses for the branch instructions which are newly written into the buffer. As will be later described, any write operation into the buffer is carried out simultaneously with a read operation using the same word address and input 900 as a read input 500 together with the appropriate byte address 501 to avoid writing into the buffer any instruction which is already held in the buffer. Other inputs and outputs are shown in FIG. 3 and their function will be described with reference to the more detailed drawings of FIGS. 4, 8 and 9.

As will be seen with reference to FIG. 3, each of the partitions 401–404 is substantially similar and therefore a detailed description of one exemplary partition 401 only will be given.

Figure 4:
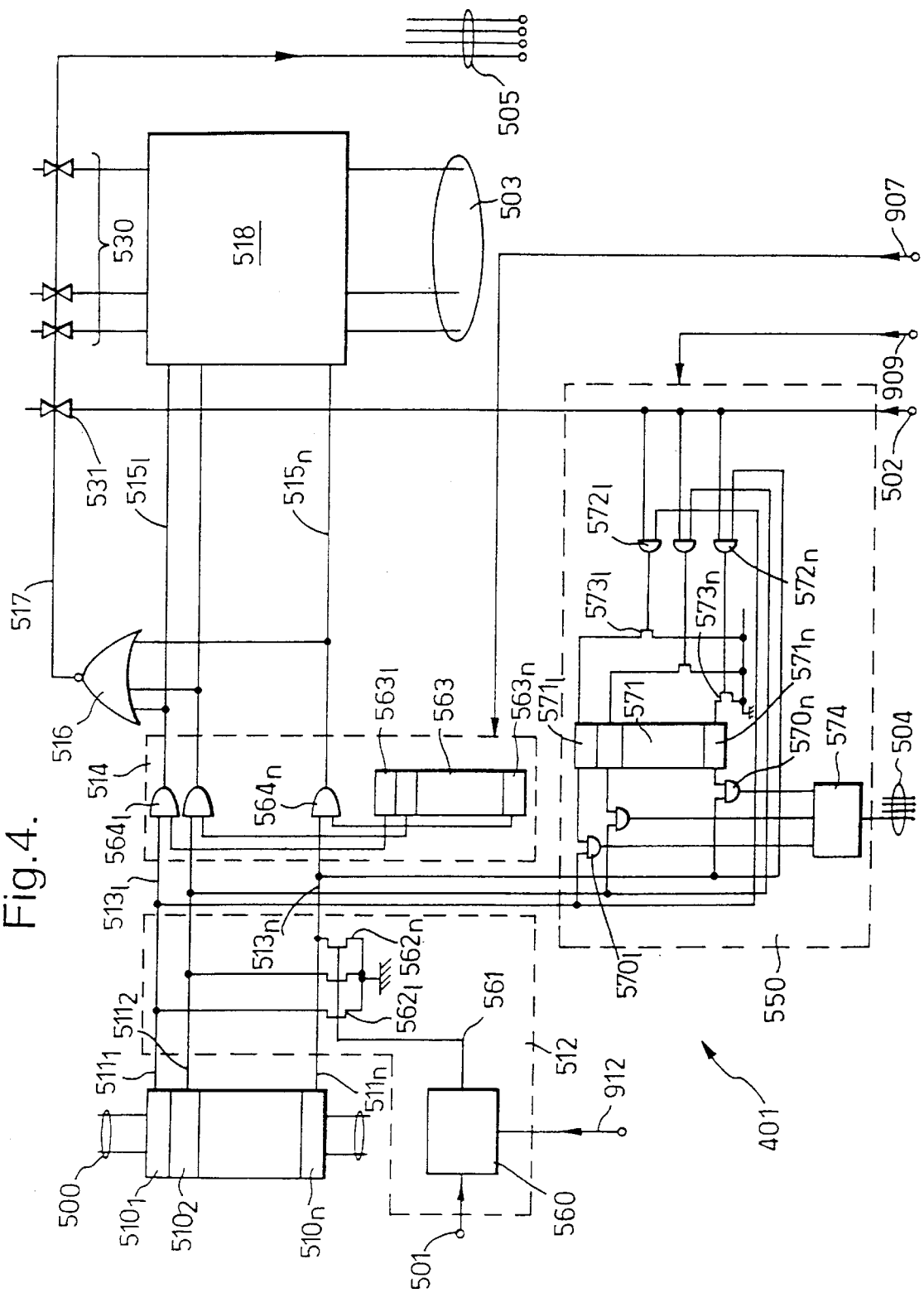
FIG. 4 shows an illustrative circuit diagram of read circuitry of a partition of the branch target buffer of FIG. 3.

Referring to FIG. 4, partition 401 consists of n content addressable memory cells $510_1$–$510_n$ coupled to the instruction word address input bus 500, having a first plurality of CAM output lines $511_1$–$511_n$. As will be later described herein, the present embodiment of the branch target buffer is operated dynamically, in the sense that once all of the lines except one contain data the partition is regarded as "full". The one unfilled line is retained for writing a new entry, and as part of the write operation, details of one branch instruction stored in the branch target buffer are discarded so as to be ready for input of a next newly-found branch instruction. A branch instruction is said to be "newly-found" if it does not exist in the branch target buffer at the time of testing for presence of the branch in the buffer. It will be noted that a branch instruction which was discarded from the branch target buffer in one cycle of operation may become a "newly-found" instruction during a later cycle of operation. Thus, whereas increasing the number n of content addressable memory cells increases the complexity and size of the device, such an increase tends to reduce the number of occasions on which a branch instruction needs to be written in.

Decreasing the number n of memory cells provides a smaller and simpler device, but with the penalty that the chances of failing to find a branch instruction are increased. Where a jump instruction is not found this tends to lead to a processing delay.

In the presently described embodiment, content addressable memory cells $510_1$–$510_n$ are capable of storing the word addresses input over the instruction word address bus 500. As will be described later herein, certain instruction word addresses are stored in the content addressable memory cells. The instruction word address of the instruction currently being fetched is input over the instruction word address bus 500 and when an instruction word address corresponding to one of the stored addresses is input a logical 1 occurs on the corresponding one of the CAM output lines $511_1$–$511_n$.

Figure 8:
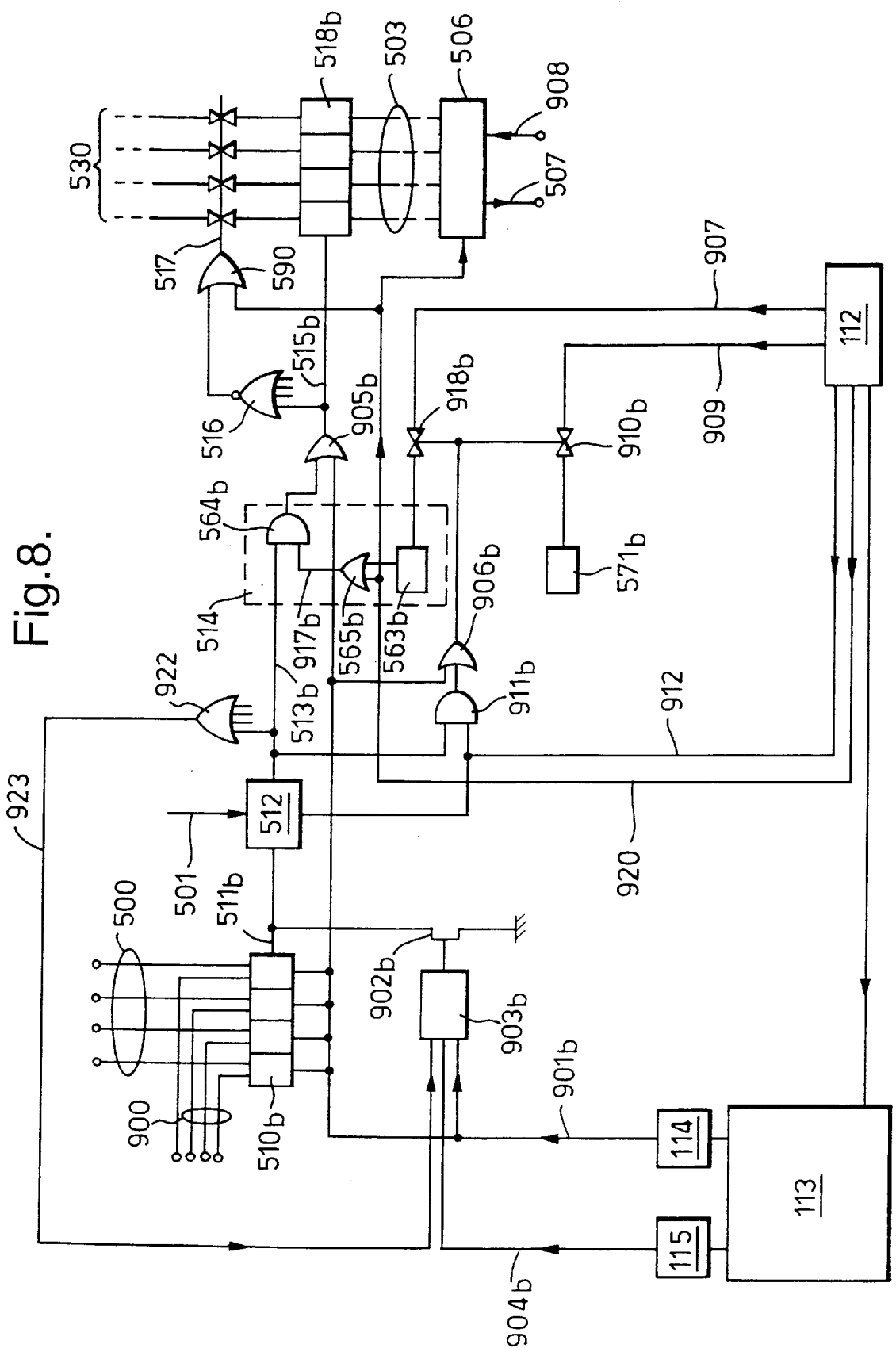
FIG. 8 shows write circuitry for one line of a partition of the branch target buffer of FIG. 3 connected to part of a computer system.

Selection circuitry 512 has an input connected to the instruction byte address bus 501 and is connected to the CAM output lines $511_1$–$511_n$ so as to selectively disable all of the lines of a partition. The selection circuitry 512 has a processing circuit 560 receiving one input from the instruction byte address bus 501 and having an output 561 connected to the control inputs of a plurality of pull down transistors $562_1$–$562_n$. Each of the pull down transistors is connected between a respective one of the CAM output lines $511_1$–$511_n$ and earth. During reading, a control input 912 sets the processing circuitry 560 to produce a high output so as to turn on all of the pull down transistors $562_1$–$562_n$ in response to the byte address input over the instruction byte address bus 501 which is greater than the number of the partition. In this way the circuits 512–812 act to mask out these partitions where the stored branch instruction has a byte location before the byte position indicated on line 501. The selection circuitry 512 has output lines $513_1$–$513_n$ which form inputs to prediction processing circuitry 514. The prediction processing circuitry 514 includes an n-location store 563 for storing prediction information for indicating whether an associated branch instruction is predicted taken or not taken. Each of the store locations $563_1$–$563_n$ corresponds to a respective CAM cell, and has an output connected to one input of a respective two input AND gate $564_1$–$564_n$, the other input of which is provided by a respective output line $513_1$–$513_n$ of the selection circuitry 512. As shown in FIG. 8, an OR gate 565 is connected between the respective store locations 563 and the respective AND gate $564_1$–$564_n$, but as this forms a direct connection during reading it is omitted from FIG. 4 for clarity. As will later be described herein, the prediction store 563 stores a logical 1 in positions corresponding to branch instructions which are predicted as taken, and a logical 0 in positions corresponding to branch instructions which are predicted as not taken. A line 907, described more fully with reference to FIG. 8, allows the writing of new prediction information to the prediction store. Each AND gate $564_1$–$564_n$ has a respective output which is connected to a respective output line $515_1$–$515_n$ of the prediction processing circuitry 514. As shown in FIG. 8, there is an OR gate 905 between the output of each AND gate $564_1$–$564_n$ and the output line $515_1$–$515_n$, but as this forms a direct connection during reading, it is omitted from FIG. 4 for clarity. The output lines $515_1$–$515_n$ form the word lines to a RAM 518 and also form inputs to an n-input NOR gate 516. The NOR gate 516 is connected to a single output line 517 which controls a first transmission gate 531 and a second set of transmission gates 530. The NOR gate output lines 517–817 from all of the partitions together form the output bus 505. As shown in FIG. 8 the output of NOR gate 516 is connected to OR gate 590 which is omitted for clarity in FIG. 4 as it has no effect during a read operation as the signal on line 920 is 0 during a read. During a write, the gate 590 in each partition receives a signal 1 on line 920.

Data RAM 518 consists of n rows of storage cells, each row of which is addressed by a respective one of the lines $515_1$–$515_n$. Each row of storage cells stores the target address of a branch instruction i.e. the address at which execution will continue if the branch is taken. This information is made available on target address output bus 503, which passes between the partitions, but which contains the transmission gates 530 for isolating partitions storing data relevant to later bytes in the same word as will be later described. Bus 503 is connected to sense amplifier circuitry 506 having a target address output 507 and a target address input 903 used during a write operation. The bus 503 forms part of a common data path interconnecting the data RAMs with respective bit lines of the data RAMs connected serially and with transmission gates in the bit line paths between adjacent data RAMs.

The branch target buffer also consists of prediction-strength processing circuitry 550.

The prediction-strength processing circuitry 550 receives, as first inputs, the output lines $513_1$–$513_n$ of the selection circuitry 512 and produces an output on prediction-strength output line 504. The prediction strength processing circuitry 550 further receives as a control input the update strength line 502, and also receives inputs from a line 909 for writing new prediction strength data. This latter is described with reference to FIG. 8.

Referring again to FIG. 3, and as mentioned above, the remaining partitions have similar structures to that of the first partition 401. The integers of each partition which are similar to those of partition 401 have similar reference numerals, the reference numerals of partition 402 being in the range 600–699, those of partition 403 being in the range 700–799 and those of partition 404 being in the range 800–899.

As previously described, between each respective partition and the adjacent partition there is a first transmission gate 531, 631, 731, 831 and a second set of transmission gates 530, 630, 730, 830. Both the first transmission gate and the second set of transmission gates are controlled by the output lines 517, 617, 717, 817 of the respective NOR gate 516, 616, 716, 816 of the associated partition. In any one partition, the operation is such that when the respective NOR gate 516, 616, 716, 816 receives a logical 1 at any one of its inputs, the corresponding output line 517, 617, 717, 817 goes to logical 0, thus rendering the respective first transmission gates 531, 631, 731, 831 and the respective second set of transmission gates 530, 630, 730, 830 non-conductive. This has the effect of interrupting the target address output bus between the relevant partition and the next higher partition. The result is that only the lowest partition in which there is a logical 1 for the input of the NOR gate 516, 616, 716, 816, can supply a target address onto the target address output bus 503. The output RAMs 518–818 are therefore connected serially to a common path to the output 503 and the control gates 530–830 in that path allocate a decreasing priority to partitions progressively moving away from the output 503. Any one partition can only provide an output if no higher priority partition is providing an output. Once one partition provides an output all lower priority partitions are blocked and cannot provide an output.

The operation of the circuitry of FIG. 3 will now be described:

Data relating to branch instructions are stored in a partition which corresponds to the byte position of the branch instruction in its instruction word. For example, data relating to a branch instruction in the first byte position of any word is stored in first partition 401, data relating to a branch instruction in the second byte position in the second partition 402 and so on. Hence for the example of FIG. 1, partition 402 is relevant to instructions 0, 4, 8, 12 and 16 (the first byte address of each instruction word), the second partition 402 stores and processes information relevant to instructions 1, 5, 9, 13, 17 and so on. Data indicating the presence of branch instructions is stored in the CAM cells of the partition, data relating to the prediction as to whether the branch is taken is stored in the prediction processing circuitry and data relating to the target address of the branch instruction in the RAM of the partition. In the presently described example, the data which indicates the presence of branch instruction is the full instruction word address of the word containing the branch instruction. As will be later described herein, is possible to store only a part of the instruction word address. The data chosen for indicating the presence of branch instructions is stored in the content addressable memory cells of the respective partition.

Figure 5:
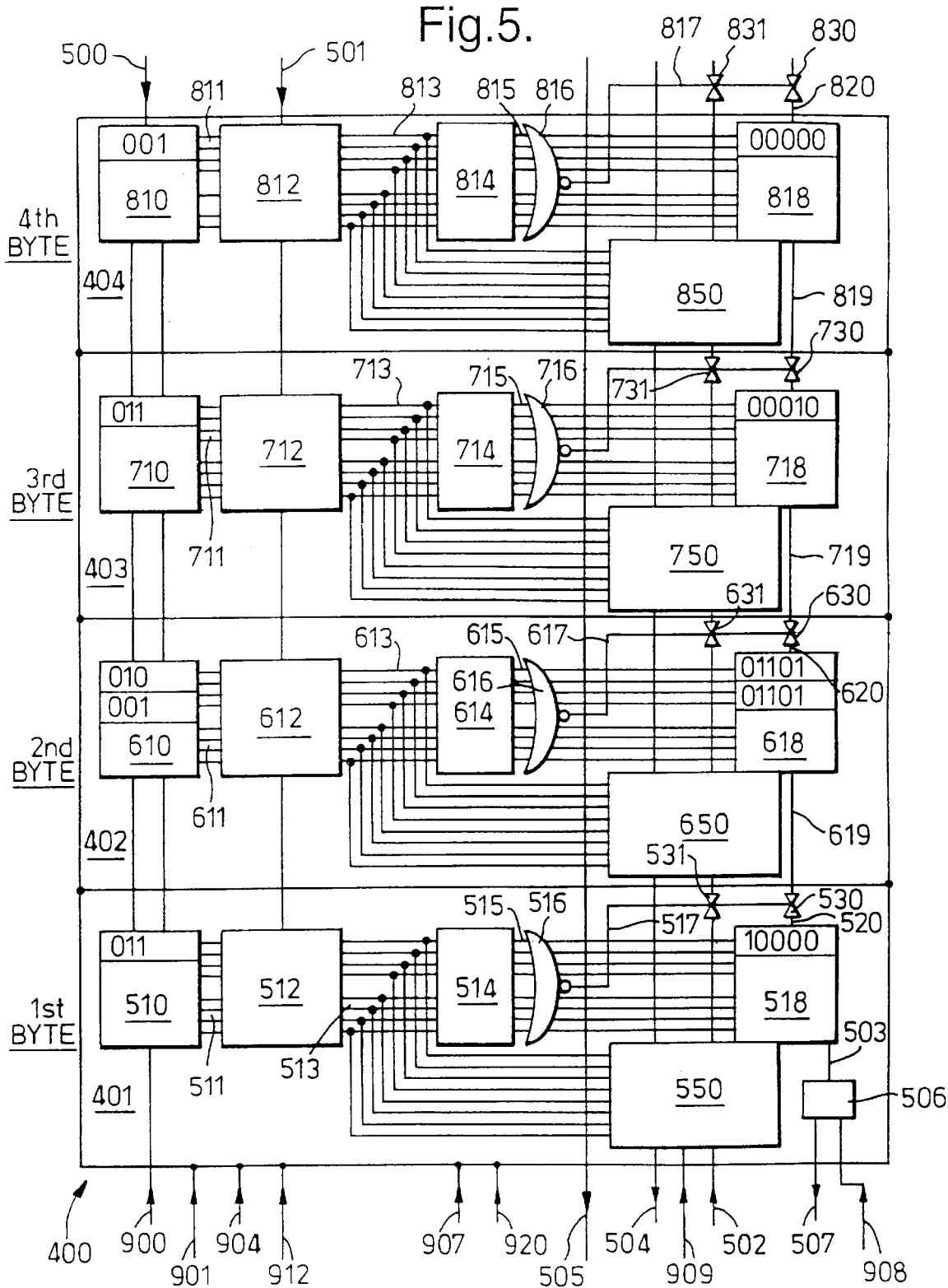
FIG. 5 shows the content of CAM cells and data RAMs of the branch target buffer of FIG. 3 when handling the instructions of FIG. 1.

The location of data identifying branch instructions is shown in FIG. 5 for the FIG. 1 example. Referring to FIG. 5, it will be seen that cells 510 of the first partition 401 contain an entry of "011" because the instruction word 104 (having address "011") has an unconditional jump instruction in the first byte position. Similarly the second and third instruction words 102,103 (word addresses "001" and "010") have conditional jump instructions at the second byte position of the instruction words, namely the positions corresponding to instructions 5 and 9. Thus, the cells 610 of second partition 402 store word addresses "001" and "010" of words 102 and 103. Entries are similarly made in the third partition (for address "011" corresponding to instruction 14) and in the fourth partition (corresponding to instruction 7).

Still referring to FIG. 5 in the context of the instructions shown in FIG. 1, an input is made to the instruction word address bus 500 of the word address of the instruction currently being fetched; this address is applied by the bus to the CAM cells 510, 610, 710, 810 of the whole device. Where a match occurs between the word addresses input to the bus 500 and an address stored in a CAM cell, a logical one output (referred to as a "CAM hit") is provided by the relevant output line of the CAM. If for example the word address "000", corresponding to word 101 is input, no matches occur in any partition and no CAM hits will occur. However, when the word address "001" of the second instruction word 102 is input over bus 500, a match occurs in the CAM cells 610 of the second partition (corresponding to instruction 5—see FIG. 1) and in the CAM cells 810 of the fourth partition (for instruction 7—see FIG. 1). The result of these matches is to produce CAM hits on the CAM output lines 611, 811 associated with the CAM cells where the hit occurred.

An input is made to the byte input address bus 501 comprising the instruction byte address, which represents the position within the instruction word at which execution is to commence. For the example shown in FIG. 5, assume that execution of the program segment shown is to start at the third instruction of second instruction word 102 (instruction 6 in FIG. 1). In this situation, the word address input over bus 500 would be "001" corresponding to the second instruction word 102. This would produce CAM hits in the second and fourth partitions. Referring again to FIG. 1, it will be seen that the byte address for the third instruction of each instruction word is "10". It is this address which is input on instruction byte address bus 501.

The selection circuitry 512, 612, 712, 812 includes respective processing circuitry 560 (see FIG. 4) which acts during reading to disable any partitions which correspond to bytes lower than the byte address input on instruction byte address input bus 501. Thus, for an input byte address of "00" no partitions will be disabled, and all selection circuits will pass any hits from input 511,611 etc to output 513,613 etc. If the instruction byte address is "01" then selection circuitry 512 of the first partition 401 will not pass any hit from an input line $511_1$–$511_n$ to an output line $513_1$–$513_n$, whereas in other partitions, any hit will be passed from input to output. If the instruction byte address were "10" then any hit would only be passed by selection circuits 712 and 812 in the third and fourth partitions, and so on. In the present case, the instruction byte address is "10", thus enabling only selection circuitry 712 and 812 to pass any hit. However, the only hit which occurs is in the fourth partition and this is therefore allowed to proceed as an input to the prediction processing circuitry 814 of the fourth partition.

It will be recalled that the prediction processing circuitry 514,614,714 and 814 each consists of respective prediction store 563 which contains a logical 1 or logical 0 indicating whether a respective branch is predicted as being taken or not, and plural AND gates 564. The AND gates receive one input from the associated selector circuitry and one from a respective entry of the register. Thus, considering instruction No 7 of FIG. 1, the prediction processing circuitry 814 of the fourth partition will either produce a logical 1 from a respective AND gate on one of the output lines 815 (if the branch instruction 7 is predicted as taken) or will produce all logical 0's on the output lines 815 (if the branch instruction 7 is predicted as not taken).

For the first situation, namely that where the branch instruction is predicted as taken, the presence of a logical 1 on the output line 815 which corresponds to the position of the branch instruction information stored in the content addressable memory 810 causes:
1. The output of NOR gate 816 to go to logical 0 and;
2. The corresponding row of the data RAM 818 to be addressed, thus outputting onto the target address output bus 503. The target address "00000", i.e. the target address of the branch instruction.

It will be noted that in the remaining, i.e. first-third, partitions 401–403, there will be no logical 1's at the output of the corresponding prediction processing circuitry 514, 614, 714. As a result, NOR gates 516, 616, 716 will have a logical 1 output which ensures that the corresponding transmission gates 530,630 etc; 531,631 etc are conductive and that the corresponding lines of the predicted-taken bus 505 will be at logical 1, save that line which is derived from the fourth partition 404. This allows the output from partition 404 to be output on lines 503 and 504.

For a second example, assume that fourth instruction word 104 in the fetched sequence is the first instruction (instruction 12) to be executed.

Now, reference to FIG. 1 shows that instruction 12 (having address 01100) is a non-conditional jump. Accordingly, every time execution proceeds to this instruction, the jump is taken and provided instruction 12 is stored in the branch target buffer, the branch target buffer circuitry will provide a logical 1 on one output line $515_1$–$515_n$ of prediction processing store circuitry 514 in the first partition 401. It will be appreciated that the fact of taking branch instruction 12 means that execution will not directly proceed to instructions 13, 14 or 15. As a result, the predicted outcome of branch instruction 14 is irrelevant because that instruction will not be executed in sequence with instruction 12. The branch target buffer takes this into account because the NOR gate 516 of the first partition provides a logical 0 output over its output line 517 to render non-conductive the transmission gates 530, 531, thus isolating the second-fourth partitions 402, 403, 404. The second set of transmission gates 530 prevents the output of target data from the data RAMs of the other partitions and, as will later be described herein, the first transmission gate 531 prevents the prediction strength of predicted unexecuted branch instructions from being updated. Although this prioritising feature has been described for the unconditional branch instruction 12, it should be noted that the branch target buffer is not aware that 12 is different to any other predicted-taken branch. The buffer will therefore treat any other predicted-taken branch in the same way, i.e. act to exclude any output for later branches in the same word.

Consider a further example in which execution of instruction word 102 is to commence from the first instruction of that word (instruction 4 of FIG. 1, having address "00100"). Assume for the purpose of this example that instruction 5 (00101) is not predicted as taken and that instruction 7 (00111) is predicted taken. The instruction word address is input over instruction word address input bus 500, which will produce logical 1 CAM "hits" in the second and fourth partitions 402, 404. The byte address "00" is input over instruction byte address input bus 501 to the selection circuitry 512, 612, 712, 812 of the partitions. As mentioned above, the "00" address causes each of the selection circuitry to pass hits from input to output, to provide corresponding logical 1's to the prediction processing circuitry. In the presently described example, such logical 1's occur in the second and fourth partitions 402 and 404. In the second partition 402, the relevant register of the prediction processing circuitry stores a "not-taken" prediction, and as a result all of the outputs of the prediction processing circuitry 614 remain logical 0, indicating no branch predicted taken. By contrast, the prediction processing circuitry 814 stores a "taken" prediction in the position corresponding to word 102 and the application of a logical 1 "hit" provides a jump taken output on one of the lines 815. This:
a) Provides a logical 0 at the output of the associated NOR gate 816; and
b) causes the data RAM 818 of the fourth partition to output a target address of "00000". As none of the "lower"

partitions has a non-conductive transmission gate, this target address is passed through to the target address output bus 503.

As a result it can be seen that the branch target buffer described above identifies only the first predicted-taken branch instruction of a sequence, which is not excluded for execution by being prior to the first instruction of the sequence to be executed, and, more specifically, the target address of that instruction.

As previously discussed with respect to FIG. 4, each partition of the branch target buffer includes circuitry 550 known herein as prediction strength processing circuitry for storing information based on the history of the branch instructions identified in the corresponding partition. As previously noted, FIG. 4 represents an exemplary partition 401 and the prediction strength processing circuitry 550 has counterparts 650, 750, 850 in the other partitions.

Prediction strength processing circuitry 550 receives inputs from each of the selection circuitry output lines $513_1$–$513_n$. A logical 1 will occur on one of those output lines $513_1$–$513_n$ when a match occurs between the word address input on bus 500 and data indicating the presence of a branch instruction stored in one of the CAM cells $510_1$–$510_n$, provided the selector circuitry 512 has not disabled the partition because the instruction in that partition is prior to a first executed instruction of the relevant sequence. Each of the inputs provides a first input to a respective AND gate $570_1$–$570_n$. The other input to each AND gate is derived from a respective entry $571_1$–$571_n$ of a store 571 in the prediction strength processing circuitry which stores information indicative of whether there is associated with the corresponding instruction a so-called "weak" prediction or a so-called "strong" prediction. In the present embodiment, a weak prediction is represented by a logical 1 stored in the corresponding stage, and a strong prediction is a logical 0 stored in the corresponding stage.

A strong prediction indicates that a high degree of confidence that the presently stored prediction is correct, and therefore unlikely to be changed whereas a weak prediction indicates a lower degree of confidence in the correctness of the present prediction, and a greater likelihood of change.

The lines $513_1$–$513_n$ also form one input to respective AND gates $572_1$–$572_n$. The other inputs to the AND gates $572_1$–$572_n$ are provided by the update enable line 502, which is common to all those gates. The output of each AND gate $572_1$–$572_n$ controls a respective pull down transistor $573_1$–$573_n$. The pull down transistors $573_1$–$573_n$ are connected to a corresponding entry $571_1$–$571_n$ of the prediction strength store 571. The output of the AND gates $570_1$–$570_n$ form inputs to an n-input OR gate 574 having output 504 which includes an output prediction strength line for each partition.

In operation, when a logical 1 appears on one of the input lines $513_1$–$513_n$ (indicating that a branch instruction has been "hit" in the partition) that logical 1 is applied to one of the AND gates $570_1$–$570_n$. The AND gate will produce logical 1 output only if the corresponding stage of the prediction strength store 571 stores a logical 1, corresponding to a "weak" prediction. If this occurs, then one of the inputs to the OR gate 574 will be at logical 1 and the output line 504 has a logical 1 indicating the prediction is weak. The logical 1 on the one of the input lines $513_1$–$513_n$ is also applied to one input of a respective one of the AND gates $572_1$–$572_n$.

The output of the AND gate $572_1$–$572_n$ will be at logical 0 unless the update enable line 502 is at logical 1 which causes an automatic update of prediction strength to an interim new value. In this event, one of the AND gates $572_1$–$572_n$ will have a logical 1 output, which causes the associated one of the pull down transistors $573_1$–$573_n$ to turn on, pulling the corresponding stage $571_1$–$571_n$ of the prediction store 571 to be pulled to logical 0, thus causing the prediction value stored in that stage to change to logical 0 indicating a strong prediction or remain at logical 0 if it was already in that state.

As previously noted, there is a respective transmission gate 531,631 etc connected in the update enable line 502 between each partition and the next higher partition. It will be recalled that this transmission gate is conductive unless the relevant partition has identified that a branch instruction is predicted taken. In that event, the transmission gate is rendered nonconductive during the operating cycle by the respective line 517, 617, 717, 817 going to logical 0. At the start of each cycle, the transmission gates are conductive, and a logical zero is applied via the line 502 to all partitions as a precharge level. The logical zero is then disconnected but the line remains at that level. Once transmission gates 531, 631 have gone non-conductive in partitions where a branch is predicted taken, a logical one is applied to the line 502. The consequence of this is that a logical 1 on the update enable line is input to each partition in ascending order up to and including any partition in which a branch instruction is predicted as taken. Later partitions, regardless of whether or not they contain predicted-taken branch instructions do not receive the logical one level needed to update the prediction and thus are not automatically updated.

If during a fetch operation an instruction word is recognised as having plural branch instructions, it is desirable that the above-discussed automatic updating take place for all those branch instructions which are not excluded from execution by virtue only of the initial execution point within the word, up to and including the first predicted-taken branch. As an example, if all of the partitions 401–404 stored a jump instruction for a particular instruction word and if execution were to start from the branch instruction in partition 402 (predicted not-taken) and the instruction in partition 403 were predicted taken, then no update should be performed on the predictions stored in partition 401 (because this instruction could not be executed) and no update should be performed upon the instruction represented by partition 404 (because the instruction represented by partition 403 is predicted as taken, thus preempting any judgements on the instruction represented by partition 404).

This update strategy is provided for in the branch target buffer in the following way:

Since in this example the byte address input over byte address input bus 501 causes the selection circuitry 512 to disable the first partition 401, there will be no logical 1s on any of the lines 513. Thus no logical ones will be applied to the prediction strength circuitry 550 and the output of the NOR gate 516 remains at logical 1. Gates 530,531 remain conductive. Although there will be a CAM hit in the second partition 402, and the selection circuitry 612 allows the corresponding logical 1 to be applied to the prediction processing circuitry 614, the 'not-taken' prediction has the consequence of providing all logical 0s at the lines 615. Thus NOR gate 616 has a logical 1 output and gates 630,631 are conductive. The appearance of a predicted-taken result in the third partition 403 causes the NOR gate 716 of that partition to provide a logical 0 output, thus rendering non-conductive the transmission gate 731. Hence the update line 502 is connected to positions 401–403, and disconnected from partition 404. No updating in partition 401 occurs because a logical 1 is required on one of the lines 513 for this to occur.

The prediction strength information, as mentioned above, provides certain information on the history of identified branch instructions.

Since the prediction of the outcome of a branch—i.e. whether or not a jump instruction is taken—is required at the time of fetching, rather than executing, the branch instruction, it is necessary to update the prediction for use the next time that particular jump instruction is fetched, depending on whether or not the prediction currently being made is found to be correct or not during actual execution. The strategy adopted in the presently-described embodiment is to update automatically to an interim new prediction on the assumption that the present prediction is, in fact, correct. If the interim prediction is found to have been correct when the branch is resolved, then the interim prediction is retained as the new prediction for the next execution, referred to herein as the resolved prediction; only if the present prediction is found to have been incorrect is there a need for correction and a corrected 'resolved prediction' is stored. The branch target buffer defaults to a state in which no branch is predicted taken for any cycle in which corrections are being undertaken. This enables the branch target buffer to be implemented as a single-port device, the single port being alternatively used for reading out of predictions and writing in of predictions.

Figure 6:
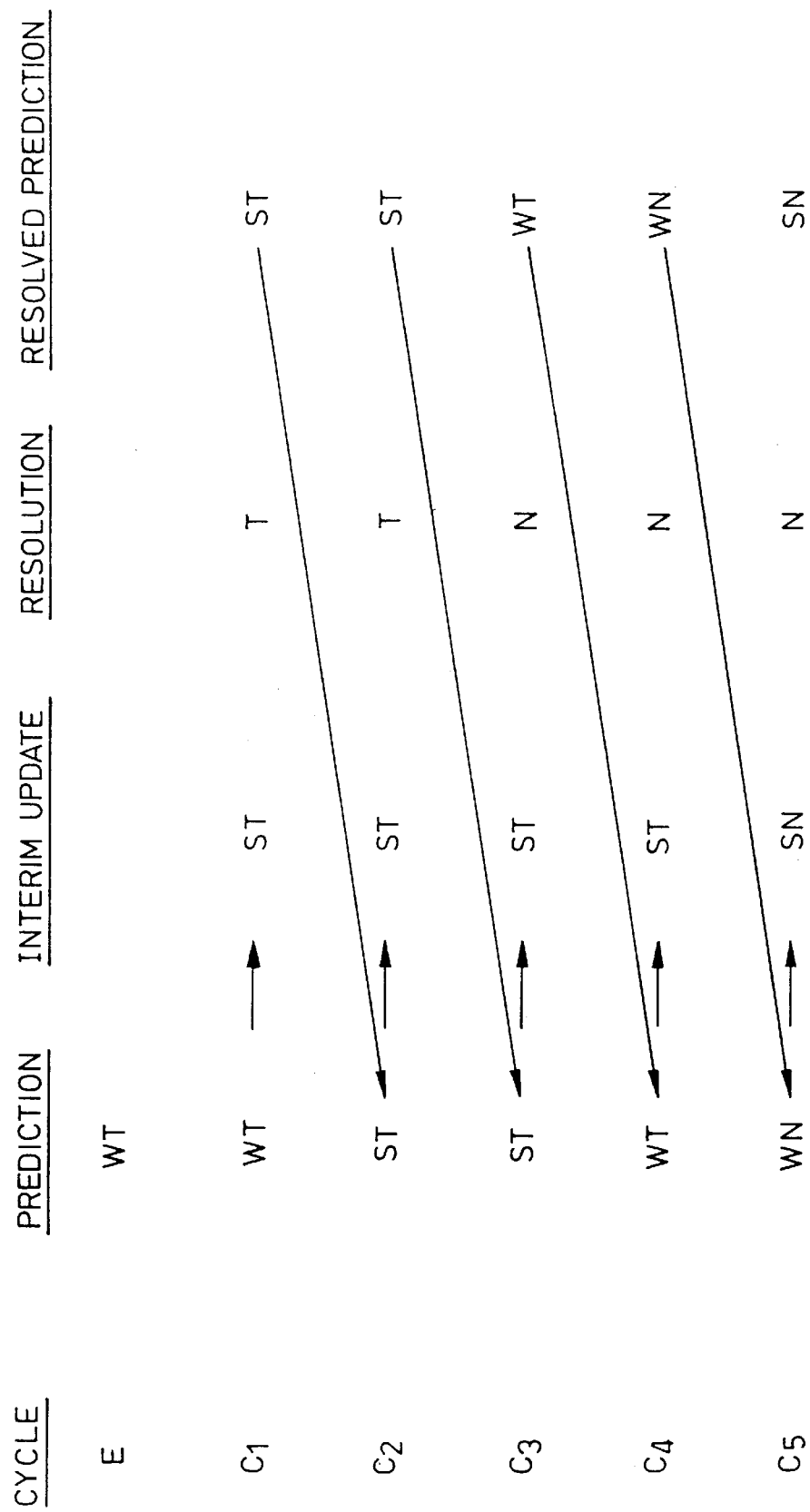
FIG. 6 shows a first example of updating the branch predicted values for an instruction.
Figure 7:
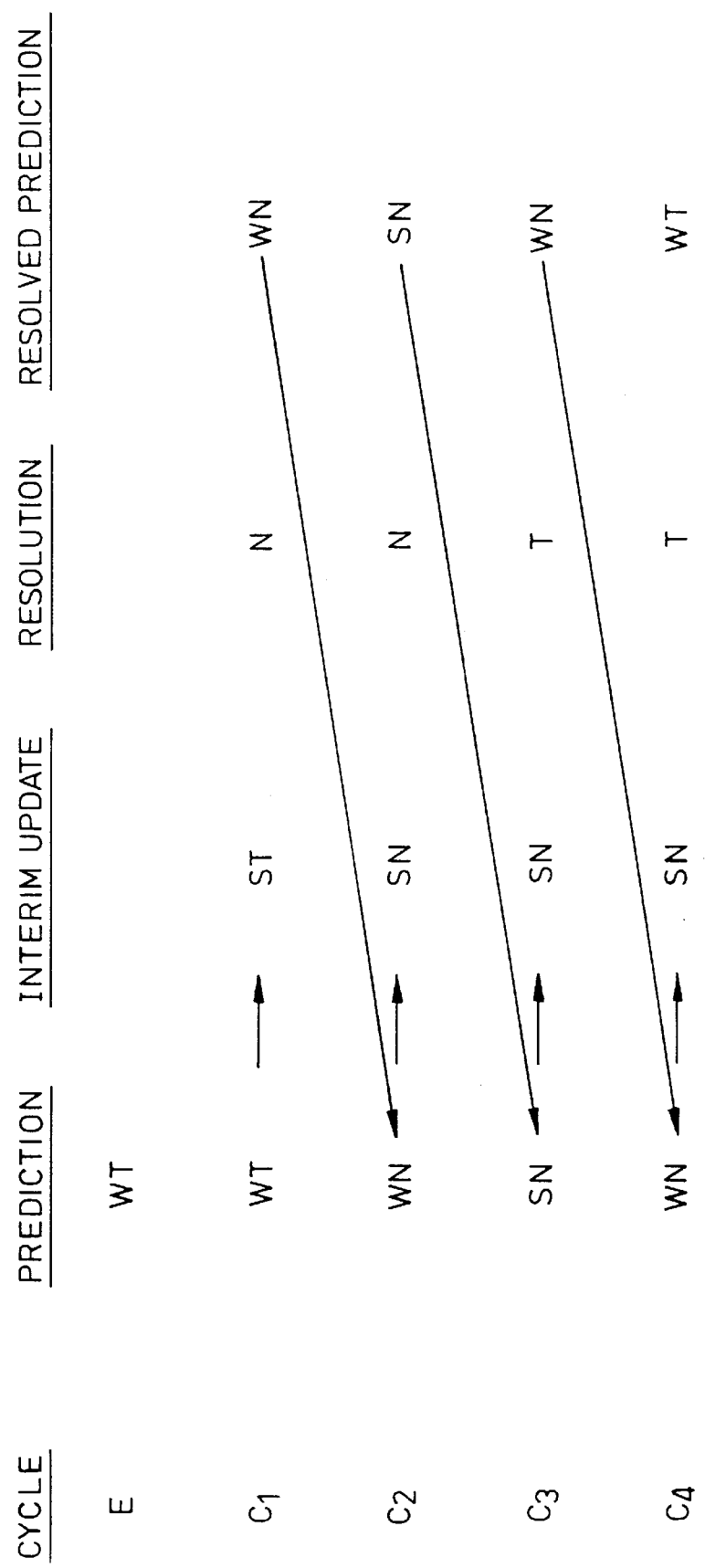
FIG. 7 shows a second example of updating branch prediction values for an instruction.

Referring to FIGS. 6 and 7, the process of updating the prediction and prediction strength will be described. Both FIGS. 6 and 7 show the history of a branch instruction which is entered into the branch target buffer during an entry cycle (E). For this explanation, it is assumed that each time the branch instruction is fetched, the previous execution of the instruction has been resolved. In practice, it may be possible for the instruction to be fetched again before a previous execution has been completed, as will be later described herein. On entry, the prediction and prediction-strength for any newly-entered jump instruction is "weakly-taken" (wT). The prediction and strength are stored as a logical 1 (indicating "taken") in the prediction store 563, 663, 763, 863 and as logical 1 (indicating "weak") in the prediction strength store 591 etc, to form the prediction for that instruction when it is executed next time.

In both FIGS. 6 and 7, cycle $C_1$ represents the next cycle in which the presently-considered instruction is fetched, and the resolved prediction for the previous cycle represents the prediction state at the time of next fetching of the instruction, i.e. the start of the cycle $C_1$. Similarly, $C_2$ represents the second occasion at which the branch instruction is fetched, and the resolved prediction for cycle $C_1$ represents the predicted value for cycle $C_2$, and so on. In each cycle, the prediction is updated to provide an interim update by assuming that the prediction at the start of the cycle was correct. If execution of the instruction shows that the prediction was in fact wrong, the interim update is discarded, and a new prediction made. This new prediction is based upon the previous prediction, at the start of the cycle, and the knowledge gained during resolution.

In the presently-described embodiment, a branch instruction is put in the BTB only when it is executed to cause a jump from the normal sequence. Thus at the end of the entry cycle, after resolution, the history of the jump instruction is "T" (Taken once).

Referring to FIG. 6 the progress of a jump instruction which is initially correctly-predicted will be described:

At the start of cycle $C_1$, the prediction is "weakly taken" and it is assumed by the branch target buffer that the jump will in fact be taken. Thus the prediction state is updated by the update enable line 502 and the automatic update circuitry 572, 573 etc to "strongly-taken". In this case, the jump is taken. There is thus no need to correct the interim prediction, which becomes the resolved prediction at the end of the cycle which includes fetching and executing the instruction. At the start of cycle $C_2$, the prediction is "strongly taken", and the jump is resolved as "taken". The interim update prediction remains strongly taken and, as the jump is resolved as being taken, the resolved prediction is likewise "strongly taken".

However, if in cycle $C_3$ the prediction is incorrect, in that the jump is resolved as being not taken then the following applies:

At a start of cycle $C_3$ the resolved prediction was "strongly taken" and the interim update is thus "strongly taken". However, as the jump is resolved as "not-taken" the prediction requires updating to "weakly taken" as shown. Thus it will be seen that the strength not the prediction is changed.

For the next cycle, $C_4$, the prediction value is still "taken", although "weakly-taken". Thus the interim update will be from "weakly-taken" to "strongly-taken", on the assumption that the predicted behaviour is correct. If however once again the jump is resolved as being not-taken, the resolved prediction must be corrected to "weakly-not-taken", in other words the correction between the resolved prediction of cycle $C_3$ to the resolved prediction of cycle $C_4$ requires the prediction to be changed, rather than the strength to be changed i.e. from "weakly-taken" to "weakly-not-taken". This change is made by an associative look-up in the present embodiment.

Finally at the start of cycle $C_5$ the prediction value is "weakly not taken", and accordingly the "interim update" is to "strongly not taken". If the jump is resolved as "not taken" the resolved prediction is "strongly not taken" whereas if the jump is resolved as taken, then the resolved prediction would be "weakly taken".

Turning to FIG. 7, the progress of a jump instruction is shown, in which the first resolution of the jump instruction after entry into the branch target buffer is incorrect. Thus, in cycle $C_1$ the interim update, assuming that the prediction value of "weakly taken" is correct, is to "strongly-taken". However, the jump is resolved as "not-taken". As a result, the resolved prediction is "weakly-not-taken", in other words requiring the prediction at the start of the cycle, which was "weakly taken" to be corrected to "weakly not taken".

At the start of cycle $C_2$ the "weakly not taken" prediction gives an interim update of "strongly not taken", and the resolution of the jump as "not taken" confirms this value as the resolved prediction. However, in cycle $C_3$, although the interim update is to remain at "strongly not taken", the resolution is "taken" thus the resolved prediction at the end of cycle $C_3$ is "weakly not taken", i.e. once again changing only the strength of the prediction, rather than the prediction itself. This should be contrasted with cycle C4, in which the predicted value of "weakly not taken", at the start of the cycle is updated to "strongly not taken", but as a result of a resolution to "taken" is finally corrected to "weakly taken", in other words a change of prediction value, not of prediction strength.

The above discussion of the branch target buffer generally relates to the circuitry in operation of the buffer in the reading mode. Details of the circuitry for writing information to an exemplary line of the branch target buffer will now be described with reference to FIG. 8. FIG. 8 shows an exemplary content addressable memory cell 510$_b$ being one of the memory cells 510 in the first partition 401. This content addressable memory cell 510$_b$ for the purpose of illustration is shown as having four storage locations for storing a four bit instruction word address. The content addressable memory cell $510_b$ has an output line $511_b$, upon which there appears a logical 1 "CAM hit" when an address input over the instruction word address input bus 500 finds a match in the CAM cell.

The output line $511_b$ passes to the previously-described selection circuitry 512 to an output line $513_b$. In the writing mode, input 912 changes state from the reading mode so that the selection circuitry 512 provides a connection between its input and output where the partition is to be written to, but for all other partitions, the circuit 512 provides no connection between input and output and those outputs are held to ground. The content addressable memory cells are not only connected to instruction word address input bus 500, but also to instruction word write bus 900. This bus is connected to each of the storage locations of the content addressable memory. Each of the storage locations of the content addressable memory $510_b$ is also connected to a write enable line $901_b$ which receives a logical 1 when the address currently appearing on the write bus 900 is to be written to the content addressable memory cell $510_b$. A separate write enable line is provided for each line of each partition. A further control line 920 connected to all partition lines is provided to allow a new target address to be written to the RAM 518.

The CAM output line $511_b$ is connected to a pull down transistor $902_b$, operable to pull the CAM output line to earth. The pull down transistor $902_b$ is controlled by a control latch $903_b$ which is selectively set or reset by an input $904_b$ to mark the line valid or invalid. The write enable line $901_b$ is also connected to one input of a two-input OR gate $905_b$, whose other input is provided by the output of the AND gate $564_b$ of the prediction processing circuitry 514 and the output of the OR gate $905_b$ forms the word line $515_b$ for row b of the RAM 518. The write enable line $901_b$ is further connected to one input of a two-input OR gate $906_b$. Register entry $563_b$ of the prediction store 563 is connected to a prediction change enable line 907 allowing a new prediction to be written in from the circuit 102 via a transmission gate $918_b$. The output of the prediction store $563_b$ is coupled via an OR gate $565_b$ to the AND gate $564_b$. The second input of the OR gate $565_b$ is provided by the control line 920. Prediction strength storage location $571_b$ is connected to an input line 909 allowing a new prediction strength to be written in from state transition circuitry 112, via a second transmission gate $910_b$. The output of the second OR gate $906_b$ provides the control input to the transmission gates $918_b$ and $910_b$. The second input to the second OR gate $906_b$ is provided by the output of an AND gate $911_b$ which receives a first input from the corresponding output of the selection circuitry 512 and a second input from an input line 912.

As previously mentioned, the write enable line $901_b$ is operative to allow an address input over write bus 900 to be stored in the CAM cell $510_b$. At all times, one line in each partition comprising a CAM cell, a line of the target address RAM and the associated prediction and prediction strength data is identified as invalid, and it is this invalid line to which a new branch jump instruction is written. To render the partition line shown in FIG. 8 invalid, an input is applied to control input $904_b$ so as to set the latch $903_b$ and render conductive the pull down transistor $902_b$. The effect of this is to pull the CAM output line $511_b$ down to earth. The CAM output line is then held at earth until a new predicted value is written into this line and the line is marked valid, as later described.

To write a new predicted-taken entry to the line shown in FIG. 8, it is necessary to write information to the content addressable memory cell $510_b$, to the target address row $518_b$, to the prediction store $563_b$ and the prediction strength store $571_b$. In the present embodiment, the prediction for a newly-entered branch is "taken" and the prediction strength is selected to be "weak"; thus the overall prediction level is "weakly-taken". To accomplish this, the circuit 112 responds to an entry command from the processor 110 to cause the first input line 907 to supply a logical 1 and the second input line 909 to supply a logical 1. When the write enable line $901_b$ goes to logical 1, the output of the second OR gate $906_b$ goes to logical 1, thus enabling the transmission gates $918_b$ and $910_b$ and causing the logical 1 on line 907 to be written to prediction store register stage $563_b$ (representing "taken") and the logical 1 on second input line 909 to be written to the prediction strength stage $571_b$ (representing "weak"). The address data presented on the write bus 900 is written to the CAM cell $510_b$, as has previously been mentioned. A logical 1 applied to line 920 ensures that OR gate 590 outputs a logical 1, thus rendering conductive the transmission gates 530. The presence of the logical 1 on the write enable line $901_b$, provided at the input to the first OR gate $905_b$ however provides a logical 1 on the word line $515_b$ to the RAM line $518_b$ and this allows target address data to be written into the corresponding line $518_b$ of the RAM 518 from a target address input signal 908.

To ensure that there is always an empty line available for each partition, every time a new branch is entered into the branch target buffer a random number generator 113 randomly selects a line in the partition which is to contain the new branch and inputs a bit to the corresponding latch 903 so that the line is marked invalid. The line to which the branch instruction is written is selected using a stored value of the previously-selected random number. This technique requires a first row decoder 115 to output signal 904 to mark a line as invalid and a second row decoder 114 to output signal 901 to add the new branch. The random number generator 113 is configured to ensure that the same number is not generated twice successively.

Figure 9:
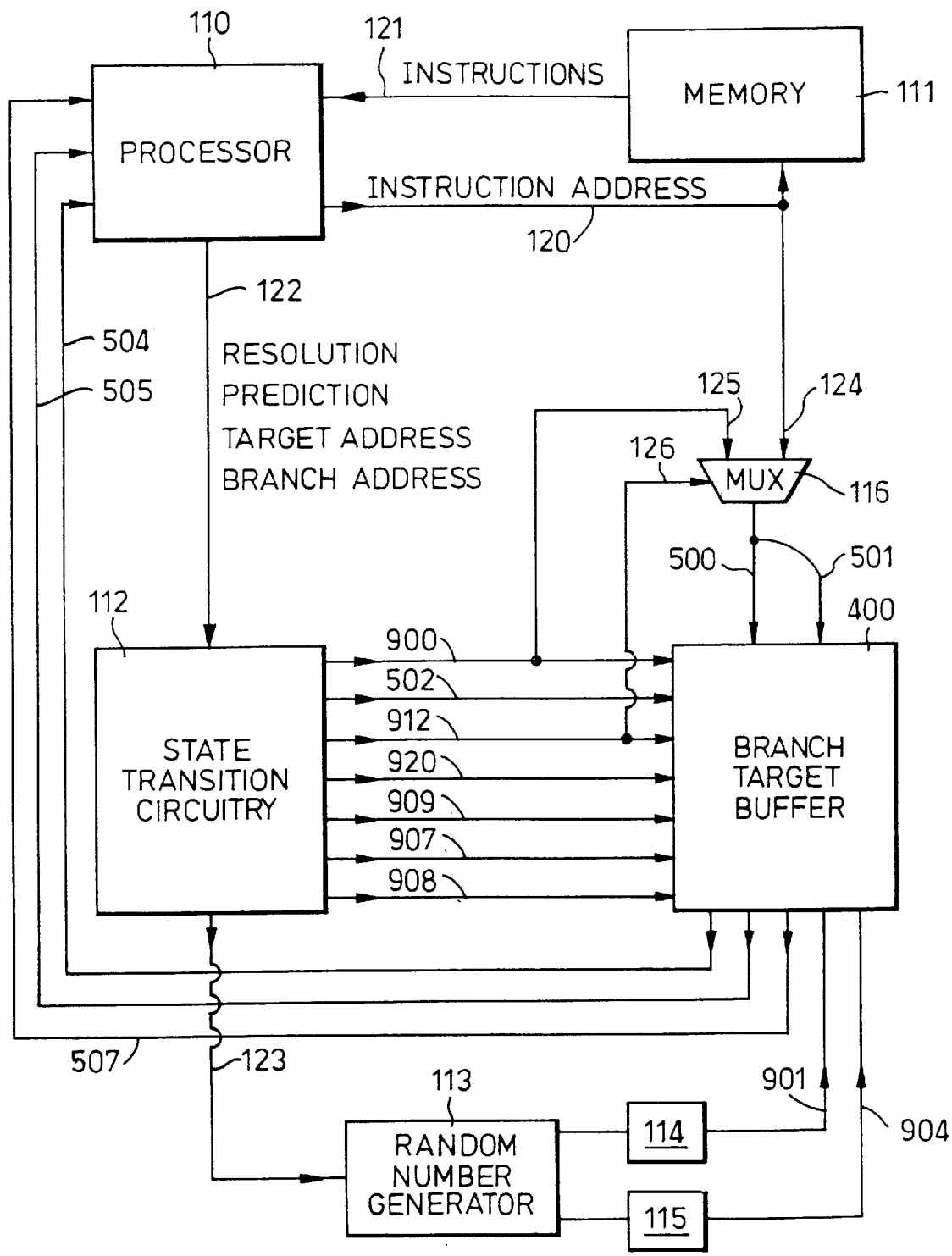
FIG. 9 shows a computer system including the branch target buffer of FIG. 3.

FIG. 9 shows schematically a computer system including the branch target buffer 400 already described. A processor 110 is arranged to fetch instructions from a memory 111 and execute a plurality of instructions in a pipelined process. The fetch address is output on line 120 and this full instruction address is supplied to the memory 111 and at the same time through a multiplexor 116 to the inputs 500 and 501 of the buffer 400. The fetched instructions are supplied on line 121 to the processor for execution and the results of a read operation in the buffer 400 are fed on lines 504, 505 and 507 to the processor 110 as previously described. At an appropriate stage in the processing pipeline, the processor 110 will resolve each branch instruction to determine whether it is in fact taken. If the processor had received from buffer 400 a correct prediction for the branch instruction then no write operation is required. If however no correct prediction had been received (due to either absence of the branch instruction in the buffer, or a misprediction by the buffer) then the processor outputs signals to the circuit 112 to cause a write. The output on lines 122 comprises the result of resolution, the prediction for that branch instruction, the appropriate target address and branch address for the instruction. These are input to the state transition circuitry 112 which provides outputs 900, 907, 908, 909, 912, 920 and 502 to the branch target buffer 400 and an output on line 123 to operate the random number generator 113. The state transition circuitry is responsive to the resolution and prediction received on line 122 to change prediction or strength of prediction values in accordance with the resolution of the branch instruction by the processor 110 as has previously been described with reference to FIGS. 6 and 7. The updated prediction and strength of prediction values are input on lines 907 and 909 to the appropriate entry in the buffer 400, together with the other data to be written, including the target address on line 908, as already described with reference to FIG. 8. In this case the output bus 900 outputs the full instruction address of the instruction for the write operation into the buffer and line 900 forms a second input to the multiplexor 116. Line 912 is set to logic 1 corresponding to a write operation and the multiplexor 116 selects the address from line 900 to input on lines 500 and 501 to carry out an associate operation on the CAM of the partition denoted by 501 in parallel with the write operation caused by an input on line 900 directly into the buffer 400. The input 900 which is received directly by the buffer 400 inputs only the word address bits of the instruction address as these are fed to the CAM arrays 510–810. In FIG. 9 the multiplexor 116 has a first input 124 from the address line 120, a second input 125 from line 900 and a control input 126 from line 912. In each write operation the branch target buffer receives an input from the state transition circuitry 112 attempting to correct the content of the buffer without distinguishing whether the error is due to a misprediction or to the absence of the branch instruction in the buffer. Accordingly, the embodiment performs the same remedial action in both situations as follows:

1. Input the instruction address to the branch target buffer for an associative match. At the same time begin to write to the invalid line in the branch target buffer, information as if the error had occurred due to absence of the branch instruction in the buffer. If the prediction on line 907 is taken, then line 920 is set to logic 1 to allow the new target address to be written. In this case signal 920 being 1 provides a logical 1 input to AND gate 564$_b$. If a CAM hit occurs for that partition row, signal 513$_b$ is set to logical 1 and consequently OR gate 905$_b$ provides a logical 1 on wordline 515$_b$ of the RAM. In addition, line 920 causes circuit 506 to put the new target address from input 908 onto the RAM bit lines 503 so that the new target address is written into that row of the RAM.

2. If the associative match creates a hit, this indicates that the branch had already been located in by the branch target buffer. As a result, the (supposedly new) branch entry is terminated by leaving the relevant line as invalid.

If the associative match resulted in no hit, then the cause of the error was a genuinely new branch, and the line to which information is being written is marked as valid. In this case none of lines 513 is high so that an output 923 of an OR gate 922 is low. Line 923 forms an input to latch 903$_b$ so as to clear the latch for the new line selected by the high signal on line 901$_b$ thereby marking that line as valid. Signal 903 causes latch 903$_b$ to respond to signal on line 904$_b$ to mark a new line as invalid.

If a wrong prediction has been made, then the automatic update properties of the described branch target buffer may result in a wrong value of interim update of prediction being stored. Reference should be made to FIGS. 6 and 7 and the corresponding description. It will be seen from this that if the original prediction were "weakly taken" or "weakly not taken" and the resolution of the branch was in the opposite direction, i.e. "not taken" or "taken", then a new value of prediction must be written to the prediction store 563. If on the other hand the originally-stored prediction was "strongly taken" or "strongly not taken" then if the branch were resolved in the opposite direction, the strength bit must be re-written. Accordingly, referring to FIG. 8 the third input line 912 permits the writing of a new prediction, and prediction strength bit into the corresponding line of the prediction store 563 and the prediction strength store 571. For re-writing of the value of prediction, or prediction strength, the write enable line 901$_b$ is kept at a logical 0, thus preventing writing of a new address into the CAM cell, or a new target address into the RAM 518, and instead the third input line 912 is taken to logical 1. The presence of a logical 1 (corresponding to the match between the input instruction address on bus 500 and the information stored in the CAM cell 510$_b$) provides a logical 1 to the second input of the AND gate 911$_b$ and a consequent logical 1 on the output of the second OR gate 906$_b$. This causes the transmission gates 918$_b$ and 910$_b$ to be rendered conductive, which allows the new prediction value to be input over line 907, and the new prediction strength value to be input over line 909.

In the embodiment described with respect to FIG. 3, no prediction is performed in cycles where a write is being made to the branch target buffer—i.e. the branch target buffer produces no target address nor prediction output.

It will be appreciated that the above example provides circuitry for preventing a double entry in the buffer for the same branch instruction. It will be understood that due to the processor pipeline, there will be delay between a new branch instruction first being fetched by the processor and found absent from the buffer and the final resolution of the branch instruction by the processor which would then result in a output through the state transition circuitry 112 to cause a write into the buffer. Although it is unlikely, it is possible that the same branch instruction could be fetched a second time by the processor before the first execution of the branch instruction has been resolved and caused a write entry into the buffer. It is therefore important to avoid the possibility of writing the same branch instruction into the buffer at a different location when the instruction was not located in the buffer the first time it was fetched by the processor. It is for this reason that an associative match on the branch address is carried out at input 500,501 in parallel with the write input on line 900. The use of the multiplexor 116 ensures that the write address on bus 900 is used simultaneously for both operations and while this parallel operation is carried out the line being written to is held invalid. If that associate operation finds a hit then the new entry line is maintained as invalid and a line on which the hit occurred has a modification of the prediction strength and target which have been input from the state transition circuitry 102. In the event that no hit was found by the associate operation the new entry line is marked as valid and a further new line is invalidated ready for a next write operation.

In FIG. 3, both the content addressable memory cells 510, 610, 710 and 810 and the data RAMs 518, 618, 718, 818 store full addresses. In the case of the CAM cell, by "full address" is intended the full fetch address of each instruction word. For the data RAM, the "full address" means the precise target address, or the offset from the address of the branch instruction to be executed.

In one embodiment however both the CAM cells and the data RAM store less than full addresses. Specifically, before a branch instruction is entered into the branch target buffer the most significant bits of the fetch address of the branch instruction are compared with the most significant bits of the target address of that instruction. This is done by a comparator circuit comparing addresses on output lines 900 and 908 from the circuit 112. If the contents of a selected number of the most significant bits of the fetch address differ from the contents of the same number of selected bits of the target address, no entry is made into the branch target buffer. If however the contents of the selected number of most significant bits are the same in both the fetch address and the target address—i.e. the result of taking the branch instruction would be to branch to a new fetch address which is in the same or an adjacent program segment to the fetch address of the instruction itself, then the lesser significant bits of the target address of that instruction are stored in the branch target buffer. Similarly only the same number of lesser significant bits of the branch instruction address are written from line 900 into the buffer 400.

In this arrangement, during instruction fetching, the full fetch address is applied to the branch target buffer, although only the relevant number of lesser significant bits of the fetch address are input over the instruction word address bus 500. It will be apparent to one skilled in the art that in this embodiment instructions from other program segments, i.e. instructions having most significant bits which differ from the most significant bit of the branch instruction which is stored may have identical lesser significant bits to those of the instructions stored. The consequence of this is that instructions may be falsely identified as being branch instructions, with consequent processing delays.

We claim:

1. A cache memory comprising a plurality of cache partitions each comprising a CAM array and a connected associated data RAM, said cache having a first input for receiving input address data to determine if the cache holds data corresponding to said input address data and thereby provide a cache hit, and circuitry for applying said input address data to all of said cache partitions, a cache output for outputting data from one of said data RAMS if a cache hit occurs, and output control circuitry arranged to determine a desired different priority for each partition, said output control circuitry comprising gating circuitry connected between said data RAMS and said cache output for providing said cache output from one of said partitions which has the highest priority with a cache hit and for inhibiting any cache output from partitions of priority lower than said one partition.

2. A cache memory according to claim 1 in which each said data RAM is connected serially in a common data path to said cache output and pass control circuitry is connected in said data path between each data RAM.

3. A cache memory according to claim 1 in which each said data RAM has bit lines, respective bit lines of each RAM being connected together serially to provide a common data path to said cache output, pass control circuitry being provided in said data path between adjacent RAMS.

4. A cache memory according to claim 2 in which said pass control circuitry is arranged to inhibit an output from any data RAM connected in said data path at a position further from said cache output than the cache partition nearest the cache output for which a hit occurs, thereby designating each cache partition in decreasing priority as its connection to said data path is more remote from said cache output.

5. A cache memory according to claim 2 in which each CAM is arranged to provide a CAM output to indicate a hit or miss in the partition of that CAM and each said CAM output is connected to respective pass control circuitry in said data path to isolate any data RAM further from said cache output when a hit occurs in that partition.

6. A cache memory according to claim 1 in which said first input is connected to each said CAM array, a second input is also provided to each CAM array and masking circuitry is provided for each partition, said masking circuitry being connected to receive said second input which is used to determine which partition is masked by its masking circuitry so as to prevent a hit output from the masked partition regardless of said first input.

7. A cache memory according to claim 6 in which said masking circuitry comprises gate circuitry in each partition connected between the CAM array and the data RAM of each partition.

8. A cache memory according to claim 6 in which said first input is a first address input for the most significant bits of one address and said second input is a second address input for the least significant bits of said one address.

9. A cache memory according to claim 1 which comprises a branch target buffer for holding in each said data RAM a target address for a branch instruction.

10. A method of operating a partitioned cache memory to provide a selected output from one partition of the cache, which method comprises connecting a CAM array and associated data RAM in each partition of the cache, providing input address data to all partitions of said cache via a first input of the cache to determine if any partition holds data corresponding to said input address data and thereby provide a cache hit, providing partition output data at a partition output of each partition having a cache hit, determining a desired different priority for each partition in the cache and controlling output circuitry connected to a cache output to permit an output of partition output data from one of said partitions which has the highest priority with a cache hit and inhibit any output of partition output data from partitions of lower priority than said one partition.

11. A method according to claim 10 in which bit lines of the data RAM of each partition is connected serially in a common data path to the cache output, said method further comprising selectively operating pass control circuitry in the data path to permit a cache output from the cache partition nearest the cache output in which a hit occurs and prevent any output from cache partitions further from the cache output than the nearest partition with a cache hit.

12. A method of operating a partition cache according to claim 10 in which an output from a cache partition nearest the cache output and having a cache hit, is supplied on said data path to a sense amplifier circuit at said cache output.

13. A method according to claim 10 in which a first input is supplied to each CAM array of the cache, said first input comprising the most significant bits of an address, a second input is provided to each partition, the second input representing the least significant bits of said address, and masking circuitry is responsive to said second input to mask selected cache partitions in dependence on said second input.

14. A method according to claim 10 which method further comprises storing in said data RAMs target addresses for branch instructions used in a computer system and inputting to said cache array an address of a branch instruction to determine if the cache has a target address for said branch instruction.

* * * * *